United States Patent [19]

Haines et al.

[11] 4,448,910

[45] May 15, 1984

[54] AQUEOUS COMPOSITIONS FOR SIZING GLASS FIBERS CONTAINING EMULSIFIED EPOXY RESIN AND CHLOROPROPYLSILANE

[75] Inventors: Richard M. Haines, Warsaw; Robert Wong, Granville, both of Ohio

[73] Assignee: Owens-Corning Fiberglas Corporation, Toledo, Ohio

[21] Appl. No.: 488,474

[22] Filed: Apr. 25, 1983

[51] Int. Cl.³ .................... B32B 17/10; C08L 39/06; C08L 91/00
[52] U.S. Cl. .................................. 523/402; 428/378; 523/411; 523/425
[58] Field of Search ..................... 523/402, 411, 425; 428/378

[56] References Cited

U.S. PATENT DOCUMENTS

| | | | |
|---|---|---|---|
| 3,772,870 | 11/1973 | Wong | 523/411 |
| 3,837,898 | 9/1974 | McCombs et al. | 428/378 |
| 3,850,869 | 11/1974 | Mohr | 428/378 |
| 4,140,833 | 2/1979 | McCoy | 523/411 |
| 4,330,444 | 5/1982 | Pollman | 428/378 |
| 4,361,465 | 11/1982 | Graham | 428/378 |
| 4,369,264 | 1/1983 | Baumann et al. | 428/378 |
| 4,394,475 | 7/1983 | Temple et al. | 428/378 |

*Primary Examiner*—Ronald W. Griffin
*Attorney, Agent, or Firm*—Ronald C. Hudgens; Greg Dziegielewski; Philip R. Cloutier

[57] ABSTRACT

Dilute aqueous sizing compositions for glass fibers containing emulsified epoxy resin, lubricant and, as the sole organosilane coupling agent, 3-chloropropyltrimethoxy silane give superior properties to glass fibers having as a size coating the in situ dried residue thereof for use as reinforcing elements in polymeric or resinous articles.

4 Claims, No Drawings

AQUEOUS COMPOSITIONS FOR SIZING GLASS FIBERS CONTAINING EMULSIFIED EPOXY RESIN AND CHLOROPROPYLSILANE

FIELD OF THE INVENTION

This invention relates to the field of liquid compositions for sizing glass fibers, and more particularly to dilute aqueous epoxy resin emulsions containing an organosilane coupling agent for sizing glass fibers, and to glass fibers sized therewith.

BACKGROUND OF THE INVENTION

Glass fibers intended for incorporation as reinforcing elements in articles fabricated from various matrix materials, such as polymeric or resinous materials, are usually provided with a light-weight size coating to protect the fibers from damage by abrasion during processing and fabrication and/or to enhance the reinforcing interaction between the fibers and the matrix material. Such size coatings typically comprise a film-forming polymeric or resinous component, a lubricant and a glass-resin coupling agent such as a partially hydrolyzable organosilane or hydrolysate thereof.

Such size coatings are usually deposited on the glass fibers during their production, which is ordinarily by attenuation of a plurality of streams of molten glass issuing from a reservoir through a corresponding plurality of orifices in a so-called bushing and solidification of the attenuated filaments by cooling. The coating is typically applied to the fibers as a liquid solution or dispersion in a volatile medium, from which the ultimate size coating is deposited on the fibers by evaporation of the medium and any other volatile components either before or after the fibers have been collected into a package as by winding onto a suitable collet.

Among the film-forming components of sizing compositions that have been employed are epoxy resins, especially where the fibers are to be used for reinforcing articles made from epoxy resins such as by winding essentially continuous multi-filament glass fiber strands about a suitable form and impregnating with a curable resin composition and then curing the matrix resin to produce a glass fiber reinforced article such as a pipe or a tank. Both dilute solutions containing epoxy resin film-formers in volatile solvents such as diacetone alcohol and dilute emulsions of epoxy resin film-formers in aqueous media have beem employed as sizing compositions for glass fibers, usually with the inclusion of other components such as an organosilane or other coupling agent and a lubricant such as mineral oil.

While a number of organosilanes or hydrolysates thereof, either alone or in varius mixtures, have been employed as coupling agents in such sizing compositions, the advantages of employing the silane component employed in the dilute aqueous epoxy resin emulsion sizing compositions of the present invention have not heretofor been appreciated in the art.

SUMMARY OF THE INVENTION

In one aspect, the present invention is a dilute aqueous composition suitable for sizing glass fibers which comprises emulsified liquid epoxy resin or emulsified liquid solution of epoxy resin, lubricant and, as the sole organosilane coupling agent, 3-chloropropyltrimethoxysilane or hydrolysate thereof.

In another aspect, the invention is an aqueous composition as above comprising about 1 to about 10 percent of the total weight of the composition of the epoxy resin, 0 to about 20 percent of the weight of the epoxy resin of solvent, about 2 to about 15 percent of the weight of the epoxy resin of the mineral oil, about 2 to about 15 percent of the weight of the epoxy resin of the polyvinylpyrrolidone, and about 2 to about 15 percent of the weight of the epoxy resin of the silane.

In still another aspect, the invention is a glass fiber having as a size coating an in situ dried residue of an aqueous composition as above.

DESCRIPTION OF PREFERRED EMBODIMENTS

Any suitable liquid epoxy resin or liquid solution of an epoxy resin that can be emulsified can be used in the dilute aqueious sizing compositions of the invention, but it is preferred to use epoxy resins which are themselves liquid at ordinary workplace temperatures, and it is further preferred to use it in combination with a suitable solvent therefor. Preferably the weight of solvent, if any, will be not greater than about the weight of epoxy resins. If the solvent is water soluble, at least a portion of it may partition into the aqueous phase of the emulsion. The solvent, if any, will be selected according to well known principles as to its solubility, stability and volatility characteristics. A particularly advantageous solvent is diacetone alcohol.

While the structure of the epoxy resins is not narrowly critical, and both linear diepoxide-terminated resins and other types of epoxide resins of equal or higher functionality, such as novolac types, can advantageously be used, the substantially linear diepoxide-terminated reaction products of a bisphenol, such as bisphenol A or bisphenol F or brominated analogues thereof, and an epihalohydrin, such as epichlorohydrin, are preferred. It is further preferred that the epoxy resin be characterized by an epoxy equivalent weight greater than about 250.

Any conventional glass fiber lubricant compatible with the emulsified epoxy resin or solution can be used. However, mineral oil is preferred as being a satisfactory lubricant which is readily co-emulsifiable with a broad selection of surfactant systems.

As the surfactant for emulsifying the liquid epoxy resin or liquid solution of epoxy resin, ordinarily any of a broad range of surfactants or mixtures of surfactants generally suitable for such purpose can be used. However, predominantly non-ionic surfactant systems are preferred. Surfactant systems comprising a major proportion by weight of alkylarylpoly(alkoxy)alkanols, and especially $C_{\geq 6}$-alkylarylpoly($C_{2\text{-}4}$-alkoxy)-$C_{2\text{-}4}$-alkanols, are particularly suitable.

The dilute aqueous sizing compositions of the present invention employ, as the sole organosilane coupling agent, 3-chloropropyltrimethoxysilane or, preferably, hydrolysate thereof. It is preferred that no other component primarily recognized as a coupling agent be included, but this is not meant to exclude components included primarily for some other functional purpose which may be shown to have also some incidental value as a coupling agent.

Inclusion of polyvinylpyrrolidone in the dilute aqueous sizing compositions of the invention is also advantageous. Other conventional components such as antistatic agents, anti-foam agents, stabilizers, thixotropic agents, etc. can also be included if desired.

Although the proportions of the various components in the dilute aqueous sizing compositions of the invention are not narrowly critical, formulations within approximately the following ranges are generally preferred:

| Component | Preferred Proportion As wt. % of total composition | As wt. % of epoxy resin |
| --- | --- | --- |
| Epoxy resin | 1–10 | |
| Solvent | | 0–20 |
| Lubricant | | 2–15 |
| 3-Chloropropyltrimethoxysilane | | 2–15 |
| Surfactant | | 15–25 |
| Polyvinylpyrrolidone | | 2–15 |
| Total non-volatiles | 1.5–15 | |

The dilute aqueous sizing compositions of the invention can be prepared following conventional practices. Thus a concentrated emulsion of the epoxy resin or epoxy resin solution can be prepared by slowly adding aqueous medium to a premixed blend of epoxy resin, surfactant and, optionally, solvent while subjecting the mixture to high shear agitation. Ordinarily a water-in-oil emulsion will form first, but will invert to an oil-in-water emulsion as more of the aqueous medium is added. It is ordinarily advantageous to maintain the components of the concentrated emulsion at a moderately elevated temperature during the emulsification process, but of course care should be taken not to employ temperatures so high as to risk excessive thermal instability or volatilization of any component. The total content of non-volatile components in such a concentrated emulsion is not critical, and can advantageously range from about 35 to about 75 percent by weight. The concentrated emulsion of the epoxy resin or epoxy resin solution can then be mixed with the other components of the dilute aqueous sizing composition and additional water in any convenient order, only low shear agitation being required for mixing. It is, however, preferred that the silane be at least partially hydrolyzed, as by mixing it with a dilute aqueous acid such as acetic or citric acid, preferably before mixing it with the other components of the sizing composition.

The dilute aqueous sizing compositions of the invention can be applied to glass fibers to form a light size coating thereon by any convenient method, such as by spraying, drawing the fibers to be sized across a rotating or stationary roll wet with the sizing composition, etc., and then drying the composition so applied in situ either before or after collecting the fibers into a package as by winding onto a rotating collet. Ordinarily and preferably the sizing composition will be applied to the glass fibers during continuous manufacture thereof, which is typically by attenuating a plurality of streams of molten glass emerging from a reservoir through orifices in a so-called bushing plate and cooling the attenuated fibers to solidify them, immediately following solidification of the fibers. In order to avoid undesirably excessive heating of the dilute aqueous sizing composition as it is applied to the newly formed glass fibers, it may be found advantageous to cool the fibers substantially below their solidification temperature, as by wetting them with water, before the sizing composition is applied.

The amount of sizing composition applied to the glass fibers is not narrowly critical, but ordinarily and advantageously a final in situ dried size coating constituting from about 0.5 to about 2.5 percent of the weight of the glass fibers can be deposited thereon. In adjusting the concentration and/or amount of the dilute aqueous sizing composition to be applied in order to achieve the desired final dried coating weight on the glass fibers, account must be taken out only of the proportion of non-volatile components therein but also of the usual loss of some of the wet coating initially applied to the fibers before it can be dried thereon.

The invention can be further understood by considering the following specific examples representing preferred embodiments thereof.

EXAMPLE 1

A concentrated emulsion of a liquid epoxy resin which was substantially a diglycidoxy-terminated reaction product of bisphenol A and epichlorohydride having epoxy equivalent weight of about 265 to about 355 and obtained from Dow Chemical Co. as a 90% solution in diacetone alcohol designated DER 337 DA 90 was first prepared as an intermediate for use in preparing dilute aqueous sizing compositions of the invention. The surfactants employed for emulsifying the epoxy resin were Igepal CO 897 (TM/GAF Corp.), a 70% solution in water of a nonylphenoxypoly(ethoxy)ethanol characterized by an HLB index of about 17.8, Igepal CO 210 (TM/GAF Corp.), a nonylphenoxypoly(ethoxy)ethanol characterized by an HLB index of about 4.6, and Methocel MC-15 (TM/Dow Chemical Co.), a methyl cellulose, all non-ionic surfactants.

The formulation of these components was as follows:

| Component | Wt. % |
| --- | --- |
| Epoxy resin | 52.3 |
| Diacetone alcohol | 5.8 |
| Igepal CO 897 | 8.0 |
| Igepal CO 210 | 1.9 |
| Methocel MC-15 | 0.1 |
| D.I. Water | Balance |
| Total non-volatiles | 60 |

The epoxy resin solution with diacetone alcohol and the principal surfactants were heated to about 150° F. and blended together in a tank equipped with Cowles high shear disperser. The methocel was pre-mixed with about ¼ of the water, heated to about 150° F., and then slowly added to the other components while the mixture was subjected to high shear agitation and the temperature maintained approximately constant. During this addition the initially formed water-in-oil emulsion inverted to an oil-in-water emulsion. Then the balance of the water was added slowly while high shear agitation was maintained. The product was a stable emulsion of about 60 percent by weight total non-volatiles and exhibited the characteristic bluish color of fine particle emulsions.

EXAMPLE 2

A dilute aqueous sizing composition was prepared from the concentrated epoxy resin emulsion of Example 1 using Emerlube 7440 (TM/Emery Industries), which contains about 40% mineral oil, about 20% amide/ester anti-static agent and about 20% surfactant in a ratio of about 3:1 non-ionic to anionic, PVP-K-90 (TM/GAF Corp.), a 22.5% solution of polyvinylpyrrolidone in water, and A-143 (TM/Union Carbide Corp.), 3- chloropropyltrimethoxysilane, according to the following formulation:

| Component | Wt. % |
| --- | --- |
| Epoxy emulsion of Ex. 1 | 12.1 |
| Emerlube 7440 | 0.6 |
| PVP-K-90 | 3.5 |
| A-143 | 0.25 |
| Glacial acetic acid | 0.20 |
| D.I. water | Balance |
| Total Non-volatiles | 9.2 ± 0.7 |

About half of the water was placed in a tank equipped with a stirrer and a premix of the epoxy emulsion of Example 1 with about 150% of its weight of water was slowly added thereto with stirring. The Emerlube 7440 and the PVP-K-90 were blended together and then about 4 times their combined weight of water was mixed therewith and this mixture was then added slowly to the main mixture with continuous stirring. The balance of the water was then added, followed slowly by the acetic acid and finally by the silane, and stirring continued for about 30 minutes more. This dilute aqueous sizing composition was applied to glass fibers during manufacture to give a dried coating weight thereon of about 1.25±0.25% of the weight of the glass fibers.

Additional dilute aqueous sizing compositions of the invention were prepared, using substantially the same procedure as in Example 2, according to the following formulations:

EXAMPLE 3

| Component | Wt. % |
| --- | --- |
| Epoxy emulsion of Ex. 1 | 11.6 |
| Emerlube 7440 | 1.0 |
| PVP-K-90 | 2.4 |
| A-143 | 0.5 |
| Glacial acetic acid | 0.5 |
| D.I. water | Balance |
| Total non-volatiles | 8.4 ± 0.2 |

This composition was applied to glass fibers during manufacture thereof to give a dried coating weight of about 1.50±0.15% of the weight of the glass fibers.

EXAMPLE 4

| Component | Wt. % |
| --- | --- |
| Epoxy emulsion of Ex. 1 | 8.05 |
| Emerlube 7440 | 1.125 |
| PVP-K-90 | 0.84 |
| A-143 | 0.30 |
| Glacial acetic acid | 0.20 |
| D.I. water | Balance |
| Total non-volatiles | 6.3 ± 0.2 |

This composition was applied to glass fibers during manufacture thereof to give a dried coating weight of about 0.83% of the weight of the fibers.

EXAMPLE 5

| Component | Wt. % |
| --- | --- |
| Epoxy emulsion of Ex. 1 | 4.9 |
| Emerlube 7440 | 0.4 |
| PVP-K-90 | 1.0 |
| A-143 | 0.2 |
| Glacial acetic acid | 0.2 |
| D.I. water | Balance |
| Total non-volatiles | 3.3 ± 0.3 |

This dilute aqueous sizing composition of the invention was applied to glass fibers during manufacture thereof to give a dried coating weight thereon of about 0.65±0.15% of the weight of the glass fibers.

The dilute aqueous sizing compositions of the invention can be advantageously employed to deposit lightweight size coatings on either conventional E-glass type fibers or on high-strength S-glass (TM/Owens-Corning Fiberglas Corp.) type fibers, and the sized glass fibers so produced can advantageously be incorporated as reinforcing elements in various matrix resins, particularly epoxy resins but also unsaturated polyester and other resins. Glass fibers sized with the compositions of the invention exhibit excellent processing characteristics, particularly exhibiting fast and thorough wetting of the sized glass fibers by liquid epoxy and other matrix resins, and produce superior shear and tensile strength in epoxy and other matrix resins in which they are incorporated as reinforcing elements.

Numerous variations and modifications of the invention as specifically described will be apparent to those skilled in the art, and are contemplated as within the scope of the invention.

We claim:
1. An aqueous composition comprising:
    (a) an emulsified liquid epoxy resin or emulsified liquid solution of an epoxy resin, said epoxy resin being a diepoxide reaction product of a bisphenol and an epihalohydrin, said epoxy resin having an epoxy equivalent weight greater than about 250, said epoxy resin comprising from about 1 to about 10 percent of the total weight of said composition;
    (b) a lubricant comprising a mineral oil in an amount of about 2 to about 15 percent of the weight of said epoxy resin; and,
    (c) as the sole organosilane coupling agent, 3-chloropropyltrimethoxy silane or hydrosate thereof, said silane or hydrosate thereof being present in an amount from about 2 to about 15 percent of the weight of the epoxy resin.
2. The composition of claim 1 further comprising about 15 to about 25 percent of the weight of the epoxy resin of a predominantly non-ionic surfactant for emulsifying the epoxy resin or solution thereof and the mineral oil.
3. A glass fiber having on its surface the residue formed by removing water from the aqueous composition of claim 2.
4. A glass fiber according to claim 3 wherein the residue comprises from about 0.5 to about 2.5 percent of the weight of the fiber.

* * * * *